(No Model.)
F. SWEETLAND.
PNEUMATIC TIRE.
No. 559,873. Patented May 12, 1896.
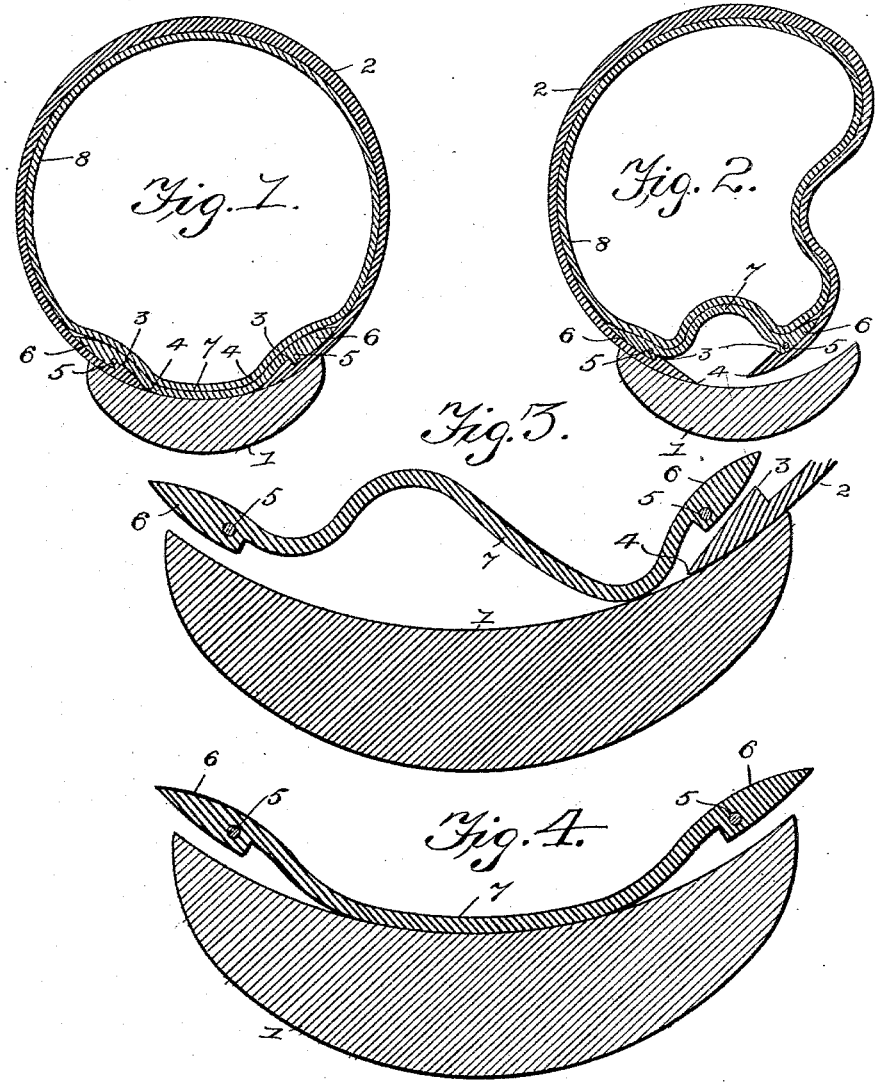
Witnesses
F. H. Monroe
R. M. Smith
By his Attorneys.
C. A. Snow & Co.
Inventor
Frank Sweetland

UNITED STATES PATENT OFFICE.

FRANK SWEETLAND, OF ANGOLA, NEW YORK.

PNEUMATIC TIRE.

SPECIFICATION forming part of Letters Patent No. 559,873, dated May 12, 1896.

Application filed May 28, 1895. Serial No. 550,995. (No model.)

*To all whom it may concern:*

Be it known that I, FRANK SWEETLAND, a citizen of the United States, residing at Angola, in the county of Erie and State of New York, have invented a new and useful Pneumatic Tire, of which the following is a specification.

This invention relates to an improvement in pneumatic tires, and has for its object to provide a simple, reliable, and efficient mechanical fastening device for securing the adjacent edges of a longitudinally-split outer case or cover of a pneumatic tire to either a wooden or metal rim, whereby the outer case or cover may be quickly removed, either partially or wholly, for giving access to the inner inflating tube and as quickly replaced and engaged, the device being applicable to any ordinary rim such as is ordinarily used for a cemented tire. By means of the fastening device hereinafter described a pneumatic tire of the character referred to may be easily and quickly applied to a rim from which a cemented tire has been removed and the use of cement or equivalent compound entirely obviated. Other objects and advantages of the invention will appear in the course of the subjoined description.

In order to accomplish the objects above mentioned, the invention consists in the combination, with a longitudinally-split pneumatic-tire case or cover, of a locking-band extending entirely around the wheel-rim and comprising a pair of inexpansive edges made from wire, cord, or canvas, the same being connected by means of a connecting web or diaphragm of flexible or elastic material, said locking-band being adapted to engage the adjacent hooked edges of the outer case or cover for holding the same to the rim.

The invention also consists in certain novel features and details of construction and arrangement or parts whereby certain advantages in point of simplicity and efficiency are attained, as hereinafter fully described, illustrated in the drawings, and finally embodied in the claims.

In the accompanying drawings, Figure 1 is a sectional view through a complete pneumatic tire with my improved fastening device shown applied and the tire shown inflated. Fig. 2 is a similar view showing the tire sufficiently deflated to allow the inexpansive edge of the locking-band to be forced inward for releasing the edge of the outer case or cover of the tire. Fig. 3 is an enlarged detail section through a wooden rim, the improved locking-band, &c., showing the manner of introducing the edge of the case or cover of the pneumatic tire beneath the inexpansive edge of the locking-band. Fig. 4 is a similar view with the outer case of the tire entirely removed.

Similar numerals of reference designate corresponding parts in the several figures of the drawings.

Referring to the accompanying drawings, 1 designates the rim of a bicycle or other vehicle to which it is desired to apply the improved fastening device. This rim may be composed of wood or metal, and is preferably left smooth and free from obstructions upon its outer concave surface or periphery, similar to rims ordinarily employed for use in connection with cemented tires.

2 designates the outer case or cover of a pneumatic tire, which is increased in thickness at its central or tread portion in the usual manner, and is split longitudinally in a manner similar to the various kinds of "clencher" tires now in common use. For the purposes of carrying out this invention, however, the adjacent edges of the outer case or cover 2 are increased in thickness in such manner as to form inwardly-projecting shoulders or lips 3, which gradually taper off to points, as indicated at 4, for facilitating the insertion of such edges beneath the locking-band, to be hereinafter described.

5 designates a pair of endless wires extending entirely around the rim and having a diameter less than the greatest diameter of the rim and greater than the least or smallest diameter of said rim. It may be stated in the outset that what will be hereinafter termed the "wires" 5 may be composed as well of strong cords or strips of canvas or other material which is incapable of longitudinal expansion. These wires 5 are embedded or let into grooves in the opposite side edges or beads of a locking-band, which also extends entirely around the rim and comprises the oppositely-disposed thickened and tapering beads or edges 6 and the connecting web or diaphragm 7. Instead of embedding the wires 5 in the beads 6, or setting said wires into grooves therein, the beads themselves may be composed wholly of some inexpensive material, such as stout cord or strips of canvas. The connecting web or diaphragm 7 is made of a material which will allow of longitudinal expansion and may be so made as to be expansive or inexpansive transversely or laterally, as preferred. The principal office of the connecting web or diaphragm 7 is to hold the wires or inexpansive beads of the locking-band apart and to force the same toward the rim, as best illustrated in Figs. 3 and 4, for placing said beads in proper position to engage the hooked or beaded edges of the outer case or cover of the tire. Another function of the locking-band is to afford ample protection for the inner tube, (indicated at 8,) the object being to prevent said inner tube from coming in contact with the rim 1 and being caught or pinched between the adjacent edges of the case or cover 2 and said rim. A further object and advantage of this arrangement is the perfect exclusion of mud, sand, &c., which in most tires of this description are apt to work their way between the rim and tire and get into contact with the inner tube, sometimes seriously and irreparably abrading and injuring said inner tube.

From the foregoing description it will be apparent that the hooked or beaded edges of the outer case or cover of the tire may be introduced between the edge of the rim and the beaded edges of the locking-band by moving the latter inward toward the center of the rim. This is permitted by means of the flexible connecting web or diaphragm, which extends across between the inexpansive wires 5. When the wires 5 or beaded edges of the locking-band are forced apart by the connecting web or diaphragm 7, they lie in close proximity to the outer edges of the rim; but when forced inward, by reason of the reduced diameter of the rim at its center, ample space will be left between the wires 5 or the beaded edges in which said wires are embedded to permit the hooked or beaded edges of the outer case or cover of the tire to be passed beneath and into engagement with the edges of the locking-band. This locking-band, or rather the connecting web or diaphragm thereof, may be made either elastic or inelastic. Where made elastic, it will be apparent that the strain upon the outer case or cover of the tire will be transmitted to the rim; but where said web or diaphragm is made inelastic such strain will be taken by the locking-band and all strain on the rim obviated as a result. It will be apparent also that the width of the locking-band may be so regulated as to throw part of the strain upon said locking-band and the remainder of the strain upon the rim. Of course where the rim is metallic this strain is not such an important factor; but when a wooden rim is employed the strain thereon becomes a serious matter by reason of the liability of such rims to split, especially after they have been used for a considerable period of time and the life of the wood has been exhausted. The locking-band may be entirely removed from the rim by pressing the wires 5 or beaded edges thereof together at the center of the rim at one side. This will allow the wires or beaded edges at the opposite side of the rim to pass over and clear either edge of the rim in a manner that will be readily understood. The width of the locking-band is preferably made greater than the width of the rim, so that the opposite edges of said locking-band will project slightly beyond the corresponding edges of the rim. This construction will facilitate the lifting of the edge of the locking-band preparatory to introducing the beaded edge of the outer case or cover beneath the same. It will be understood that the inner tube is provided with the usual inflating-valve, which extends through the locking-band and the rim, adapting the tire to be inflated from the inside of the rim in the ordinary manner.

It will be apparent that changes in the form, proportion, and minor details of construction may be resorted to without departing from the spirit or sacrificing any of the advantages of this invention.

Having thus described the invention, what is claimed as new, and desired to be secured by Letters Patent, is—

1. In a fastening device for pneumatic tires, the combination with the outer case or cover split longitudinally and formed at or near its edges with continuous hooks or beads, of a transversely-elastic locking-band extending entirely around the rim and formed with continuous hooks or beads which project toward the rim for engaging the beaded edges of the outer case or cover, and the longitudinally-extending parallel wires embedded in the hooked or beaded edges of said locking-band and having a diameter less than the diameter of the rim at its side edges, substantially as and for the purpose specified.

2. In a fastening device for pneumatic tires, the combination with the outer case or cover split longitudinally and formed at or near its edges with continuous hooks or beads, of a locking-band extending entirely around the rim and formed with continuous hooks or beads at its edges adapted to interlock with the tire edges in close proximity to the extreme side edges of the rim, the beaded or hooked edges of the locking-band being provided with longitudinally continuous and inelastic reinforcements of less diameter than the rim at its side edges, and the intermediate portion of the locking-band between the reinforcements being elastic both longitudinally and transversely, substantially as described.

In testimony that I claim the foregoing as my own I have hereto affixed my signature in the presence of two witnesses.

FRANK SWEETLAND.

Witnesses:
G. W. COOK,
F. J. STONE.